United States Patent [19]

Sugden

[11] Patent Number: 4,940,115
[45] Date of Patent: Jul. 10, 1990

[54] DIFFERENTIAL WITH BLEED HOLES FOR DEAERATION OF OIL FOR LUBRICATING JOURNALS

[75] Inventor: Kenneth B. Sugden, Rockford, Ill.

[73] Assignee: Sundstrand Corporation, Rockford, Ill.

[21] Appl. No.: 324,751

[22] Filed: Mar. 17, 1989

[51] Int. Cl.[5] .............................................. F01M 9/10
[52] U.S. Cl. .................. 184/6.12; 184/6.23; 74/467; 464/7
[58] Field of Search ............... 184/6.12, 6.23; 74/467, 74/468; 464/16, 7

[56] References Cited

U.S. PATENT DOCUMENTS

| | | | |
|---|---|---|---|
| 4,104,933 | 8/1978 | Campbell | 184/6.12 |
| 4,459,869 | 7/1984 | Bucksch | 184/6.12 |
| 4,793,440 | 12/1988 | Iseman | 184/6.23 |

FOREIGN PATENT DOCUMENTS

| | | | |
|---|---|---|---|
| 966346 | 7/1957 | Fed. Rep. of Germany | 184/6.23 |
| 5524279 | 10/1989 | Japan . | |
| 8804747 | 10/1989 | World Int. Prop. O. . | |

Primary Examiner—Ira S. Lazarus
Assistant Examiner—Alan Cariaso
Attorney, Agent, or Firm—Antonelli, Terry, Stout & Kraus

[57] ABSTRACT

A lubrication system (40, 60) for an integrated drive generator in accordance with the present invention includes a source of pressurized oil; a carrier (12), rotatably mounted on a axis of rotation, having an inlet (32) for receiving pressurized oil from the source and an outlet (38) for discharging a mixture of oil and air, and rotatably supporting a plurality of planetary gears (14) as the carrier rotates; a plurality of first ports (26), each port being associated with a different planetary gear for supplying only oil to a journal (31) rotatably supporting the associated planetary gear upon rotation of the carrier when pressurized oil is supplied to the inlet, each first port being disposed at a radial position on the carrier at a point displaced from the axis of rotation; and a deaerator (42), in fluid communication with a mixture of air and oil moving radially outward from the axis of rotation during rotation of the carrier to each of the first ports, for removing air from the oil so that only oil moves radially outward to the first ports and for discharging a mixture of oil and air at the outlet.

14 Claims, 3 Drawing Sheets

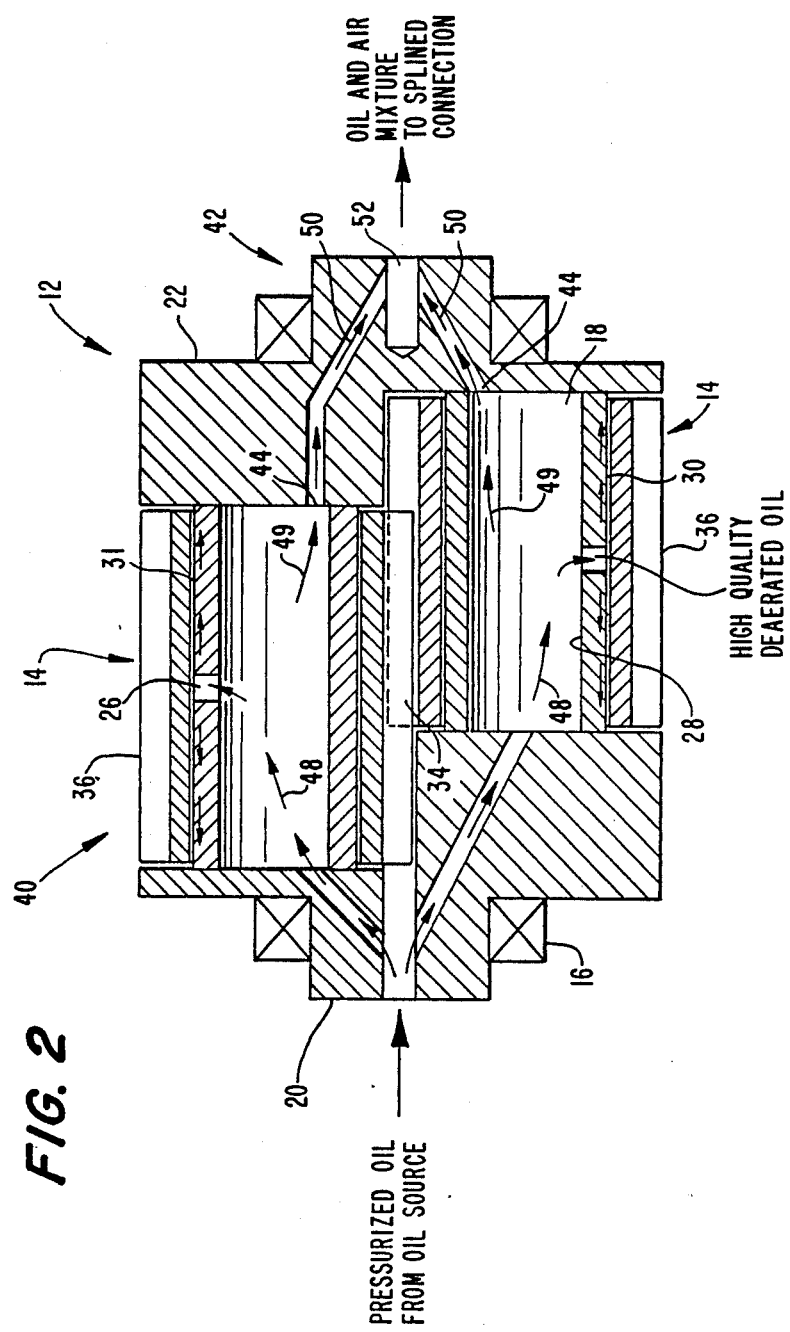

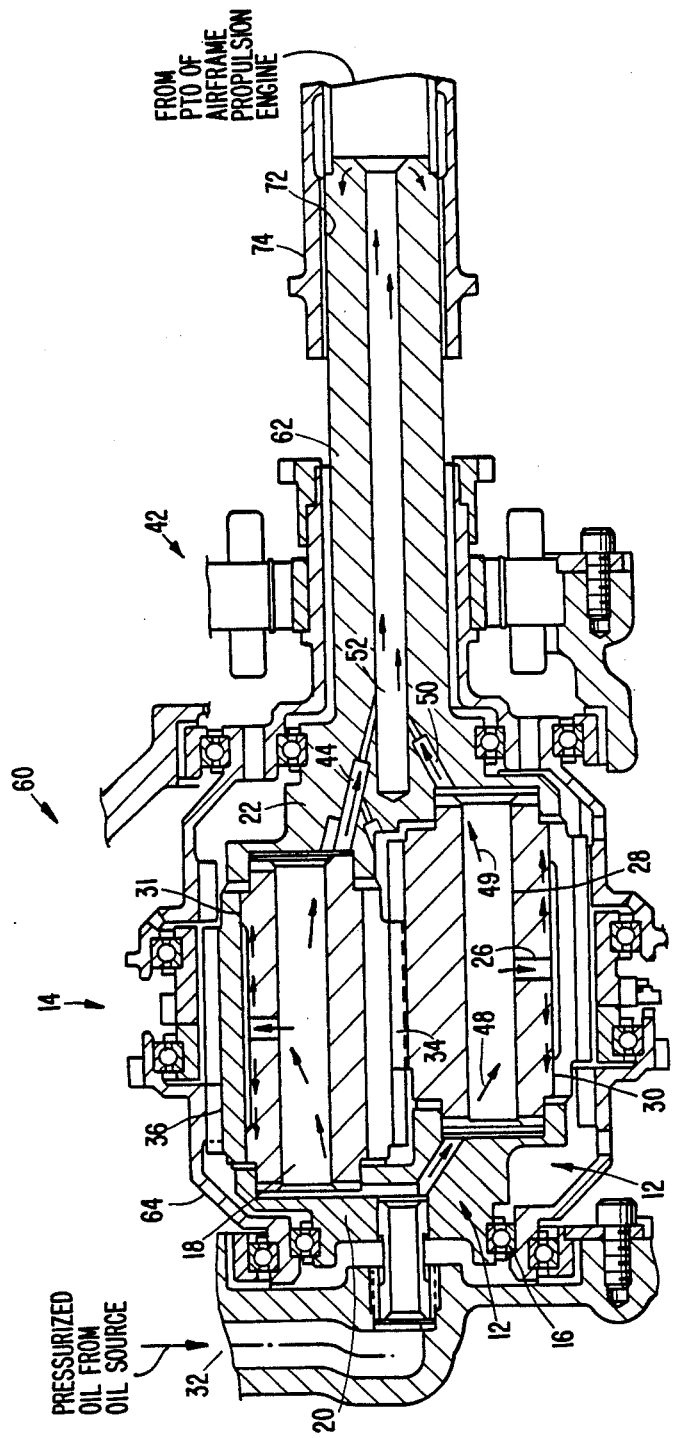

DIFFERENTIAL WITH BLEED HOLES FOR DEAERATION OF OIL FOR LUBRICATING JOURNALS

TECHNICAL FIELD

The present invention relates to integrated drive generators for generating constant frequency alternating current in airframes. More particularly, the present invention relates to lubrication systems for differentials in constant speed drive transmissions within integrated drive generators.

BACKGROUND ART

An integrated drive generator is used for generating three phase constant frequency alternating current in airframes. Integrated drive generators manufactured by the assignee of the present invention include a constant speed drive transmission having a differential. The differential functions to produce a constant speed output which drives a three phase alternating current generator from a variable input speed taken from a power takeoff from an airframe propulsion engine. The differential mechanically couples a first ring gear which is driven by a hydraulic pump and motor combination at a variable velocity to a second ring gear which drives the three phase alternating current generator at a constant velocity. A carrier supporting the differential is rotatably driven by the variable velocity input from the airframe propulsion engine.

FIG. 1 illustrates a simplified schematic of a prior art differential 10 manufactured by the assignee of the present invention which was used in an integrated drive generator. This schematic has been highly simplified in order to illustrate a lubrication system utilized in the prior art differential. The differential 10 includes a carrier 12 which rotatably supports a pair of planetary gears 14. The carrier 12 is driven by a power takeoff from an airframe propulsion engine (not illustrated). The mechanical coupling of the carrier 12 to the airframe propulsion engine has not been illustrated which is connected to the right-hand portion of the carrier. A pair of bearings 16 rotatably support the carrier 12 in a housing (not illustrated) of the integrated drive generator (not illustrated). The carrier 12 has a pair of cylindrical openings 18 which are defined by cylindrical hollow shaft attached to the end plates 20 and 22 by a pin (not illustrated). Port 26, which extends between inner surface 28 and outer surface 30 of each hollow shaft 24, functions to transmit oil from the cylindrical opening 18 to journal 31 of planetary gear 14. The aforementioned pin insures that each hollow shaft 24 is disposed in a position which maintains the port 26 in a radial position located as far as possible from the axis of rotation of the carrier to insure high pressure oil being applied to the journals 31.

Lubrication of each of the journals 31 of the pair of planetary gears 14 is critical as a consequence of the high mechanical loads which they bear in transmitting torque between the variable speed output of a hydraulic pump and motor combination (not illustrated) which is applied to the ring gear (not illustrated) which drives the top planetary gear, torque applied from the variable speed power takeoff from the airframe propulsion engine which is applied to the right-hand portion of the carrier 12 and torque which is outputted to the output ring gear (not illustrated) driving a main generator (not illustrated) which is driven by the bottom planetary gear 14.

The lubrication system of the prior art differential of FIG. 1 is described as follows. Pressurized oil is provided from an oil source at a pressure such as 150 psi. The pressurized oil is applied to inlet 32. The oil flows from inlet 32 through openings 33 and axially along the cylindrical openings 18 between the ends 20 and 22. During operation, the carrier 12 is typically rotating at rotational velocities of several thousand revolutions per minute. The rotation of the carrier centrifugally accelerates the oil within the cylindrical openings 18 to cause it to flow radially outward toward the inner surface 28 of the hollow shaft 24. The clearance between the outer surface of the shaft 24 and the inner surface 31 of the gear 36 is typically several thousandths of an inch. Port 26 accepts oil at a pressure equal to the sum of the inlet pressure plus the centrifugal head and directs it to a groove (not illustrated) in the journal 31 to provide hydrodynamic bearing capability. The oil source supplies a flow rate of oil into inlet 32 which is greater than the combined flow rate through the port 26.

A splined coupling (not illustrated) couples the power takeoff from the airframe propulsion engine (not illustrated) to the carrier 12. This splined coupling requires lubrication to prevent fretting between the surfaces of the coupling. Oil is provided to the splined coupling by providing a port 35 to receive oil flowing outward from the axis of rotation. The position of the oil port 35 is not drawn to scale and is not intended to represent an actual position in the carrier side 22 of the assignee's integrated drive generators. The actual position of the opening 36 of the oil port 35 in different designs of integrated drive units of the assignee varied. However, it should be understood that the port(s) 35 in the prior art were not provided for receiving oil flowing outward toward each of the first ports 26 for deaerating the oil so that only deaerated oil moved radially outward to each of the ports 26 and for discharging a mixture of oil and air to the outlet 38.

The journals 31 of the planetary gears 14 are critical components which require high quality oil at all times during operation. The entraining of air within the oil being applied to the journals can shorten the life of the journals and lead to increased maintenance or premature failure.

DISCLOSURE OF THE INVENTION

The present invention provides an improved lubrication system for the journals of planetary gears in a differential of an integrated drive generator used for generating three phase constant frequency alternating current in airframes. The invention insures that oil which is applied to the journals of the planetary gears within the differential is of the highest quality with air having been removed by a deaerator which is in fluid communication with a mixture of air and oil moving radially outward from the axis of rotation of a carrier to each of the journals. Lower quality oil, which is a mixture of air and oil which has been separated by the deaerator from high quality oil which flows to the journals, is discharged along the axis of rotation of the carrier for lubricating a splined connection between the carrier and another shaft coupled to a power takeoff of an airframe propulsion engine. By deaerating the oil flowing to each of the journals rotatably supporting the planetary gears, premature failure and/or increased maintenance are avoided.

A lubrication system in accordance with the invention includes a source of pressurized oil; a carrier, rotationally mounted on an axis of rotation, having an inlet for receiving pressurized oil from the source and an outlet for discharging a mixture of oil and air, and rotatably supporting a plurality of planetary gears as the carrier rotates; a plurality of first ports, each first port being associated with a different planetary gear for supplying only oil to a journal rotatably supporting the planetary gear upon rotation of the carrier when pressurized oil is supplied to the inlet, each first port being disposed at a radial position on the carrier at a point displaced from the axis of rotation; and a deaerator, in fluid communication with a mixture of air and oil moving radially outward from the axis of rotation during rotation of the carrier to each of the first ports, for removing air from the oil so that only oil moves radially outward to the first ports and for discharging the mixture of oil and air to the outlet. Each first port is disposed within a hollow cylindrical shaft fixedly attached to the carrier at a point on the shaft displaced away from the axis of rotation of the carrier with an outside surface of the shaft being the journal for one of the planetary gears. Each deaerator comprises a second port having an inlet coupled to the mixture of oil and air moving radially toward the associated planetary gear at a position radially inward from the first port associated with the planetary gear and an outlet coupled to the outlet of the carrier so that the mixture of oil and air moves into the inlet of the second port to cause the air and oil to be discharged from the outlet and oil without air to move radially outward to the first port associated with the planetary gear. The source of pressurized oil supplies pressurized oil to the inlet of the carrier at a flow rate which is greater than a combined flow rate of oil from the plurality of first ports. Preferably, the carrier is disposed within a constant speed drive transmission of an integrated drive generator for generating constant frequency alternating current; and the carrier is coupled to a power takeoff of an airframe propulsion engine.

BRIEF DESCRIPTION OF THE DRAWINGS

FIG. 2 illustrates a general schematic of an oil supply in accordance with the present invention for use in an integrated drive generator.

FIG. 3 illustrates a preferred embodiment of the present invention as utilized in an integrated drive generator.

BEST MODE FOR CARRYING OUT THE INVENTION

Figure 1:
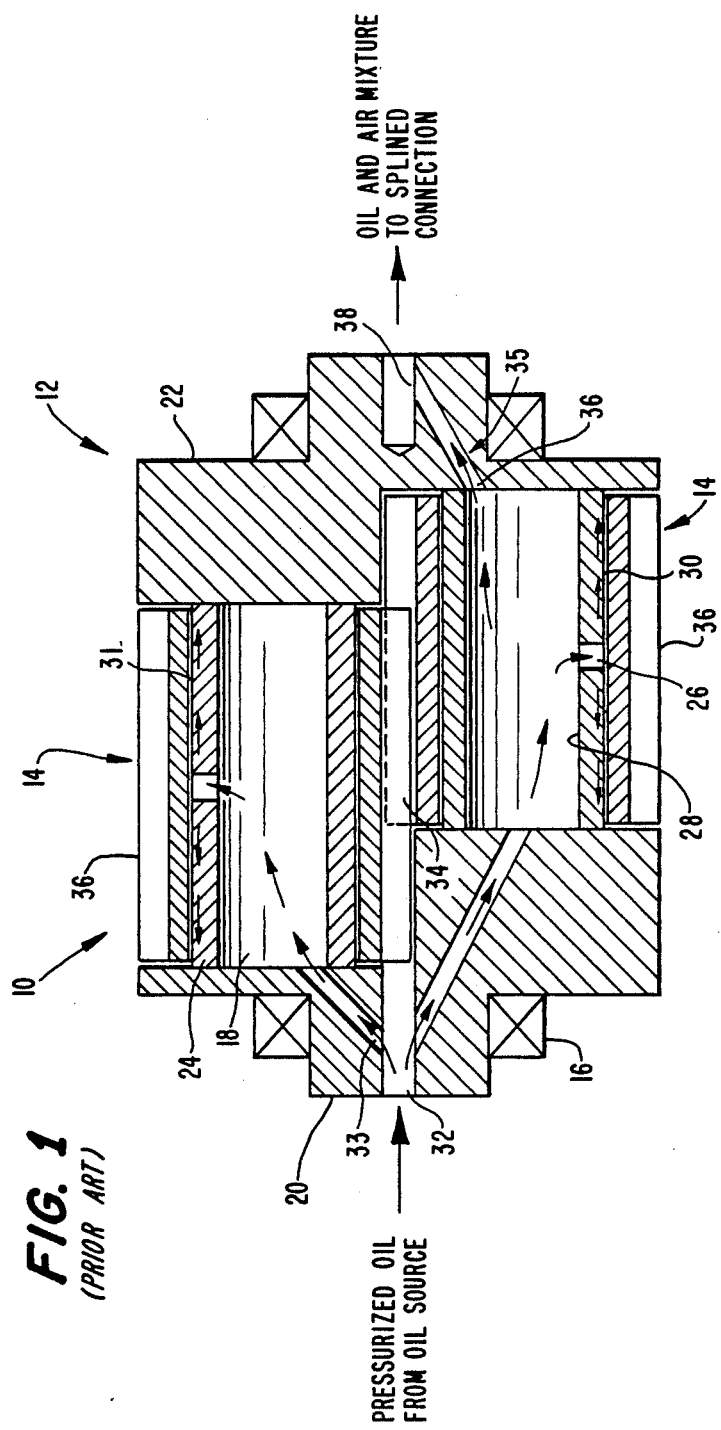
FIG. 1 illustrates a general schematic of prior art oil supply utilized in an integrated drive generator.

FIG. 2 illustrates a schematic of a lubrication system 40 in accordance with the present invention. Like parts are identified by like reference numerals in FIGS. 1 and 2. Aspects of the operation of the prior art of FIG. 1 and the embodiment of FIG. 2 which are common are not discussed unless they are necessary for understanding the invention. The embodiment 40 differs from the prior art of FIG. 1 in that a deaerator 42 is provided to deaerate oil flowing radially outward from the axis of rotation to each of the first ports 26 to insure that only high quality deaerated oil reaches the ports 26 to lubricate the journals of the planetary gears 14. The deaerator 42 comprises a second port 44 located radially inward with respect to the axis of rotation from each associated port 26 to remove air from a mixture of oil and air 46 which is flowing radially outward to the associated port 26. As a result of the second ports 44 being located radially inward from the ports 26 with respect to the axis of rotation of the carrier 12, the oil 48 is centrifugally accelerated radially outward without containing substantial air with a mixture of air and oil 49 flowing through channels 50 coupling the ports 44 to the center of the carrier 52. The mixture of oil and air 49 flows axially to the right along a center bore (not illustrated) of the carrier to a splined connection in accordance with the prior art of FIG. 1 to lubricate the splined connection. By providing a second port 44 in association with each of the planetary gears 14, in contrast to the prior art which did not provide a port in association with each of the planetary gears, the present invention insures that the highest quality oil reaches each of the journals 31 of the planetary gears 14 to guard against excessive wear or premature failure. The flow rate of oil provided by the oil source into the inlet 32 is greater than the combined flow rate through the ports 26.

It should be understood that the placement of the second ports 44 should be radially inward from the first ports 26 and as close as possible to the axis of rotation of the carrier to insure that the greatest amount of air entrained in the oil and air 49 moving radially outward is discharged from the carrier 12 so that only high quality deaerated oil 48 flows toward the ports 26. It should be understood that the actual configuration of the carrier may vary from that illustrated in FIG. 2 and further that the placement of the second ports 44 is not limited to the placement as illustrated in FIG. 2 with other placements being possible within the scope of the invention as long as each second port is located radially inward from the associated port 26 and is in fluid connection to oil flowing radially outward from the axis of rotation to each of the first ports 26.

FIG. 3 illustrates a second embodiment 60 of the present invention to be utilized in a commercial integrated drive generator manufactured by the assignee of the present invention. Like parts are identified by like reference numerals in FIGS. 2 and 3. It should be understood that FIG. 3 is only a partial view of the aforementioned commercial integrated drive generator with conventional structures which form no part of the present invention having been omitted for purposes of clarity. The differential 10 has a first input 62 which is connected to the carrier 12. A second input is applied to the differential 10 by means of ring gear 64 which is driven by the output of a hydraulic pump and motor combination (not illustrated) that functions to add or subtract rotational velocity from the first input 62 to produce a constant velocity output on output 66 which is a second ring gear that is linked to a shaft carrying a main generator (not illustrated) by a gear drive (not illustrated). A permanent magnet generator (not illustrated) is attached to the output 66. A splined connection 72 joins the first input 62, which is connected to the carrier 12, to a shaft 74 that is mechanically connected to a power takeoff from the airframe propulsion engine when electrical power is being generated by the integrated drive generator containing the embodiment 60 of FIG. 3.

While the invention has been described in terms of its preferred embodiments, it should be understood that numerous modifications may be made thereto without departing from the spirit and scope of the present inven-

What is claimed:

1. A lubrication system comprising:
    a source of pressurized oil;
    a carrier, rotationally mounted on an axis of rotation, having an inlet for receiving pressurized oil from the source and an outlet for discharging a mixture of oil and air, and rotatably supporting a plurality of planetary gears as the carrier rotates;
    a plurality of first ports, each first port being associated with a different planetary gear for supplying only oil to a journal rotatably supporting the planetary gear upon rotation of the carrier when pressurized oil is supplied to the inlet, each first port being disposed at a radial position on the carrier at a point displaced from the axis of rotation; and
    deaerating means, in fluid communication with a mixture of air and oil moving radially outward from the axis of rotation during rotation of the carrier to each of the first ports, for removing air from the oil so that only oil moves radially outward to the first ports and for discharging a mixture of oil and air at the outlet.

2. A lubrication system in accordance with claim 1 wherein:
    each first port is disposed within a hollow cylindrical shaft fixedly attached to the carrier at a point on the shaft displaced away from the axis of rotation of the carrier with an outside surface of the shaft being the journal for one of the planetary gears.

3. A lubrication system in accordance with claim 1 wherein the deaerating means comprises:
    a plurality of second ports, each second port being associated with a different planetary gear, having an inlet coupled to the mixture of oil and air moving radially toward the associated planetary gear at a position radially inward from the first port associated with the planetary gear and an outlet coupled to the outlet of the carrier so that the air in the mixture of oil and air moves into the inlet of the second port to cause the air and oil to be discharged from the outlet and oil without air produced by operation of the deaerating means to move radially outward to the first port associated with the planetary gear.

4. A lubrication system in accordance with claim 2 wherein:
    a plurality of second ports, each second port being associated with a different planetary gear, having an inlet coupled to the mixture of oil and air moving radially toward the associated planetary gear at a position radially inward from the first port associated with the planetary gear and an outlet coupled to the outlet of the carrier so that the air in the mixture of oil and air moves into the inlet of the second port to cause the air and oil to be discharged from the outlet and oil without air produced by operation of the deaerating means to move radially outward to the first port associated with the planetary gear.

5. A lubrication system in accordance with claim 1 wherein:
    the source of pressurized oil supplies pressurized oil to the inlet of the carrier at a flow rate which is greater than a combined flow rate of oil from the plurality of first ports.

6. A lubrication system in accordance with claim 3 wherein:
    each first port is disposed within a hollow cylindrical shaft fixedly attached to the carrier at a point on the shaft displaced away from the axis of rotation of the carrier with an outside surface of the shaft being the journal for one of the planetary gears.

7. A lubrication system in accordance with claim 5 wherein:
    each first port is disposed within a hollow cylindrical shaft fixedly attached to the carrier at a point on the shaft displaced away from the axis of rotation of the carrier with an outside surface of the shaft being the journal for one of the planetary gears.

8. A lubrication system in accordance with claim 1 wherein:
    the carrier is within a constant speed drive transmission of an integrated drive generator for generating constant frequency alternating current; and
    the carrier is coupled to a power takeoff of an airframe propulsion engine.

9. A lubrication system in accordance with claim 2 wherein:
    the carrier is within a constant speed drive transmission of an integrated drive generator for generating constant frequency alternating current; and
    the carrier is coupled to a power takeoff of an airframe propulsion engine.

10. A lubrication system in accordance with claim 3 wherein:
    the carrier is within a constant speed drive transmission of an integrated drive generator for generating constant frequency alternating current; and
    the carrier is coupled to a power takeoff of an airframe propulsion engine.

11. A lubrication system in accordance with claim 4 wherein:
    the carrier is within a constant speed drive transmission of an integrated drive generator for generating constant frequency alternating current; and
    the carrier is coupled to a power takeoff of an airframe propulsion engine.

12. A lubrication system in accordance with claim 5 wherein:
    the carrier is within a constant speed drive transmission of an integrated drive generator for generating constant frequency alternating current; and
    the carrier is coupled to a power takeoff of an airframe propulsion engine.

13. A lubrication system in accordance with claim 6 wherein:
    the carrier is within a constant speed drive transmission of an integrated drive generator for generating constant frequency alternating current; and
    the carrier is coupled to a power takeoff of an airframe propulsion engine.

14. A lubrication system in accordance with claim 7 wherein:
    the carrier is within a constant speed drive transmission of an integrated drive generator for generating constant frequency alternating current; and
    the carrier is coupled to a power takeoff of an airframe propulsion engine.

* * * * *